United States Patent [19]

Sonnweber et al.

[11] 4,394,953
[45] Jul. 26, 1983

[54] METHOD OF JOINING INDIVIDUAL PARTS OF AN X-RAY ANODE, IN PARTICULAR OF A ROTATING ANODE

[75] Inventors: Alfred Sonnweber, Lermoos; Hubert Bildstein, Reutte; Lambert Egger, Höfen, all of Austria

[73] Assignee: Schwarzkopf Development Corporation, New York, N.Y.

[21] Appl. No.: 247,539

[22] PCT Filed: Jul. 7, 1980

[86] PCT No.: PCT/AT80/00022
§ 371 Date: Mar. 12, 1981
§ 102(e) Date: Mar. 10, 1981

[87] PCT Pub. No.: WO81/00226
PCT Pub. Date: Feb. 5, 1981

[51] Int. Cl.³ .................. B23K 1/20; H01J 35/10; B23K 1/19
[52] U.S. Cl. .................. 228/124; 228/165; 228/168; 228/263 A
[58] Field of Search .......... 228/124, 165, 166, 168, 228/169, 174, 263 A, 154

[56] References Cited

U.S. PATENT DOCUMENTS 3,710,170  1/1973  Friedel ................. 313/330
3,751,702  8/1973  Dietz .................. 313/60
3,887,723  6/1975  Kaplan ................. 427/58
4,061,263 12/1977  Ohlstein ............... 228/124

FOREIGN PATENT DOCUMENTS 1127179  4/1962  Fed. Rep. of Germany.
2807561  9/1979  Fed. Rep. of Germany.
2258704  1/1975  France.
942164  11/1963  United Kingdom.

Primary Examiner—Kenneth J. Ramsey
Assistant Examiner—Marc Hodak
Attorney, Agent, or Firm—Morgan, Finnegan, Pine, Foley & Lee

[57] ABSTRACT

In the manufacture of rotating anodes for X-ray tubes consisting of a basic body made of high-melting metal or its alloys and one or a plurality of graphite parts, the graphite parts (3) are provided with grooves (5) and boreholes (6) before the individual parts are joined by soldering. The grooves (5) mainly having a semicircular cross section are provided in the surface (4) of the graphite parts (3) to be joined by soldering. The boreholes (6) extend through the graphite parts (3) and feed into the grooves (5) approximately vertical to the graphite surface (4). Excessive solder and gases formed during soldering may flow or escape by way of the grooves and boreholes, which produces an improved soldered joint with increased adhesive or bonding strength between the basic body and the graphite parts.

2 Claims, 2 Drawing Figures

METHOD OF JOINING INDIVIDUAL PARTS OF AN X-RAY ANODE, IN PARTICULAR OF A ROTATING ANODE

The present invention relates to a method of joining individual parts of an X-ray anode, in particular of a rotating anode, by which a part composed of high-melting metal or its alloys is joined by soldering with one or a plurality of graphite parts.

In commercial X-ray apparatuses, the X-rays are normally induced by bombarding high-melting metals with electrons. Since only about 1% of the electron energy is converted by this method into X-radiation and the remaining 99% of the electron energy is converted into heat, it is necessary in the design and construction of X-ray anodes to take measures in order to remove or radiate from the X-ray anode the heat generated at the point hit by the electrons. Graphite is known to be a good heat radiator. It has thus been proposed already in the past to provide X-ray anodes, in particular rotating X-ray anodes made of high-melting metals for heavy duty tubes, with graphite parts joined therewith by soldering, in order to enhance the dissipation of heat. A number of solders with low vapor pressure and good wettability have been proposed for such soldered joints, in particular the metals titanium, zirconium, platinum and paladium-nickel alloys. The soldering operation is carried out in a high vacuum.

Until now, such soldered joints were often the cause of operational failures. The adhesion between the parts joined by soldering was not satisfactory, and the soldered joints could be produced only with a quality that was insufficiently reproducible. The layer of solder was generally too thick and the thickness of the layer was disadvantageously uneven even within one soldered combination. The surfaces to be joined showed hollow spaces with no solder and shrinkage cavities caused by or in the course of solidification which, furthermore, could not be detected with sufficient reliability by test methods which do not cause damage.

The cause for layers of solder with uneven thickness are mainly the problems in connection with the exact adjustment of the parts to be combined during the soldering process and the necessity related thereto of having to use rather too much than too little solder in order to largely avoid in this way zones having no solder. Voids are caused, among other things, by the fact that the metals used as solder are oxidized on their surfaces, so that reaction with graphite during the soldering action causes the formation of carbon oxide gases which cannot sufficiently well escape from the layer of solder.

Safely obtaining a homogeneous soldered joint with the lowest possible thickness of the layer of solder is a basic requirement for the increased thermal capacity and increased heat radiation by the graphite parts desired for such types of X-ray anodes. If these requirements are not satisfied, the results are in many cases overheating of individual zones of the rotating anode, the formation of cracks and distortions in the anode, and ripping of the soldered joint. Moreover, the above-mentioned inclusions of gas within the layer of solder may slowly escape from the anode through the pores of the graphite while the X-ray unit is in operation and subsequently lead within the highly evacuated X-ray tube to highly undesirable electrical instabilities, discharges and shorts.

It is, therefore, the problem of the present invention to provide a method of joining high-melting metal parts and graphite parts in X-ray anodes by soldering, in particular in rotating anodes, and to avoid by said method the above shortcomings of the methods known to date.

According to the present invention said problem is solved by providing the graphite surface to be soldered with grooves which are mainly semicircular in cross section and which do not intersect the edges of said graphite surface, and by through-drilling the graphite parts approximately vertically to the graphite surface to be combined by soldering, with the boreholes feeding into the grooves, so that excessive solder can leak off and gases formed during the soldering operation may escape.

The grooves are normally milled into the graphite surface to be combined by soldering mainly in an annular form with a depth of from a few tenths of one millimeter up to a few millimeters. The spacing between individual grooves within the zone of the surface to be soldered and the number of boreholes must be adjusted to the materials to be joined, the solder and the soldering conditions.

Various types of highly solid graphites were found to be highly suitable for the graphite parts; preferably tungsten, molybdenum and different types of molybdenum alloys are used as high-melting metals for X-ray anodes. The zone defining the point hit by the electrons or the focal path of the electrons is advantageously made of tungsten or alloys of tungsten and rhenium, osmium, iridium, rhodium, platinum and others.

The application of the method is not limited to a defined geometric shape of X-ray anodes, however, mainly dish- or disk-shaped rotary anodes of high-performance X-ray tubes with high heat generation are presently considered for the application of the method of the present invention.

The invention is explained in greater detail with the help of FIGS. 1 and 2.

Figure 1:
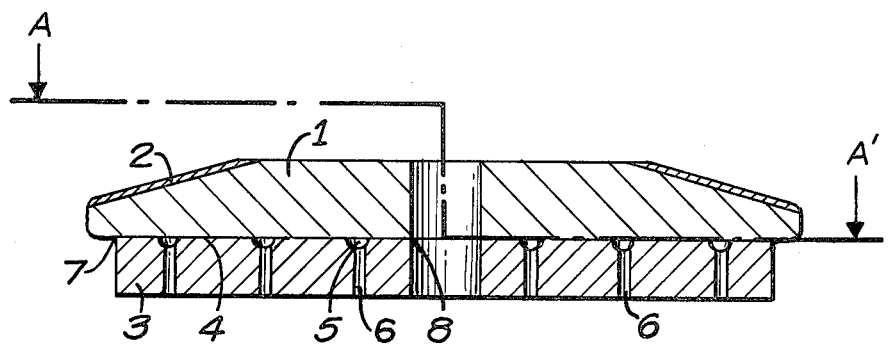
FIG. 1 shows a section through a rotating X-ray anode in the direction of the axis of rotation.

FIG. 1 shows that the rotating X-ray anode has a top part 1 made of high-melting metal, for example a molybdenum alloy. The zone of the focal path 2 is made of a tungsten alloy, for example tungsten-rhenium. For improving the heat radiation from the bottom side of the rotating anode, a graphite disk 3 is applied by soldering to the metal part of the rotating anode. The joint is made within the zone of borderline 4. Now, in order to obtain a perfect soldered joint, grooves 5 are milled into the graphite surface to be joined, and boreholes 6 are drilled starting at said grooves and extending through to the oppositely disposed surface of the graphite. Furthermore, the solder, for example zirconium, is applied to the graphite surface to be joined, namely in the known manner in the form of wire or sheet material. The plane-parallel surfaces of the graphite disk and the high-melting metal part which are to be joined are subsequently pressed against each other; the anode is admitted in this state into a high-vacuum furnace and then heated by means of induction heating to a temperature such that the solder starts to melt gradually, starting on the outer side of the anode. Since the solder exhibits good wettability with high-melting metals and graphite and has a positive capillary force opposite said materials, uniform soldering of the parts is achieved while safely obtaining at the same time a thin layer of solder. The excessive solder leaks off via the grooves and boreholes. The gases formed during soldering or admitted during soldering into the layer of solder from the graphite pores escape at the same time outwardly by way of the grooves and boreholes.

Figure 2:
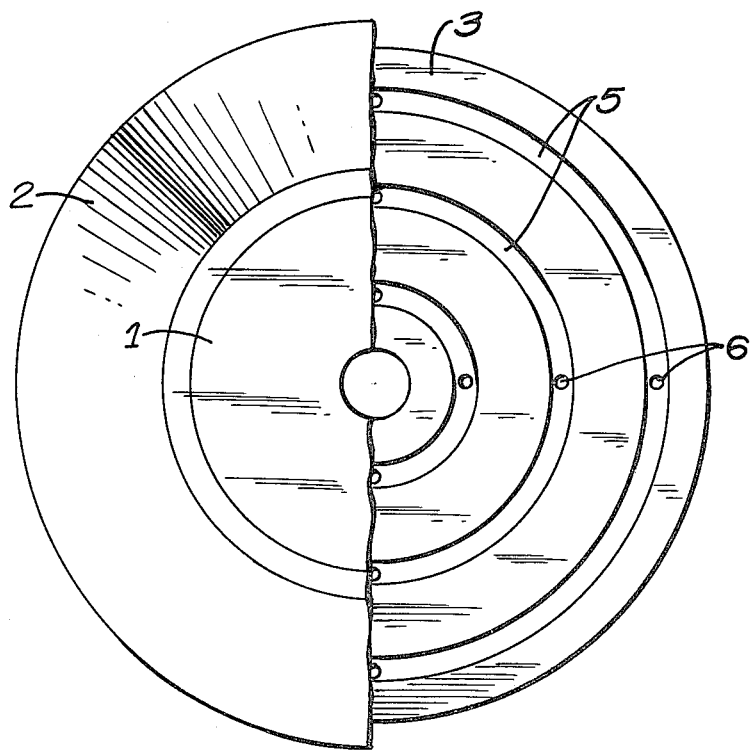
FIG. 2 shows a cut through the rotating anode along line A–A'.

FIG. 2 illustrates the preferably circular shape of the grooves in the graphite surface. However, the grooves may also have a spiral shape or may be provided in radial direction. Of decisive importance is merely that the grooves end within the edges 7 and 8 on the graphite surface, i.e. the grooves must not intersect the edges 7 and 8.

In a modification of the method specified above, the solder may be admitted exclusively or for the most part into the grooves. Due to the positive capillary forces, the liquid solder is in this case drawn in sufficient amounts into the soldered area without forming layers of solder with an undesired thickness.

Such soldered joints in rotating anodes have an excellent heat transfer, so that neither distortions nor cracks are caused within the anode, and the adhesion of the soldered joint is fully satisfactory. In X-ray operations, such anodes do not exhibit uncontrolled gassing with discharges and shorts as consequential phenomena.

We claim:

1. A method for joining individual parts of an X-ray anode, in particular of a rotating anode, comprising providing a metal part composed of a high-melting metal or an alloy thereof and at least one graphite part having a graphite surface provided with grooves which are non-intersecting with the edges of said graphite surface, and said graphite part being provided with a plurality of approximately vertical boreholes extending through said graphite part towards said graphite surface and opening into said grooves, soldering the metal part to the graphite surface of said graphite part and removing excessive solder and gases formed during said soldering through said grooves and said boreholes.

2. A method according to claim 1 wherein the grooves are semicircular in cross section.

* * * * *

UNITED STATES PATENT AND TRADEMARK OFFICE
CERTIFICATE OF CORRECTION

PATENT NO. : 4,394,953

DATED : July 26, 1983

INVENTOR(S) : Alfred Sonnweber, et. al.

It is certified that error appears in the above-identified patent and that said Letters Patent is hereby corrected as shown below:

On the Title page, item [75], after "Hofen" delete "," and insert -- ; Helmut Petter, Reutte --.

Signed and Sealed this

Twenty-fifth Day of May, 1993

Attest:

MICHAEL K. KIRK

Attesting Officer     Acting Commissioner of Patents and Trademarks